United States Patent
Yashiki et al.

(10) Patent No.: US 12,500,016 B2
(45) Date of Patent: Dec. 16, 2025

(54) NON-ORIENTED ELECTRICAL STEEL SHEET AND MANUFACTURING METHOD THEREFOR

(71) Applicant: NIPPON STEEL CORPORATION, Tokyo (JP)

(72) Inventors: Hiroyoshi Yashiki, Tokyo (JP); Yoshiaki Natori, Tokyo (JP); Kazutoshi Takeda, Tokyo (JP); Ichiro Tanaka, Tokyo (JP); Yoshihiro Arita, Tokyo (JP); Hiroki Hori, Tokyo (JP); Wataru Ohashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 321 days.

(21) Appl. No.: 18/274,154

(22) PCT Filed: Feb. 17, 2022

(86) PCT No.: PCT/JP2022/006300
§ 371 (c)(1),
(2) Date: Jul. 25, 2023

(87) PCT Pub. No.: WO2022/176933
PCT Pub. Date: Aug. 25, 2022

(65) Prior Publication Data
US 2025/0037912 A1  Jan. 30, 2025

(30) Foreign Application Priority Data

Feb. 17, 2021 (JP) .................. 2021-023510

(51) Int. Cl.
| | | |
|---|---|---|
| *H01F 1/147* | (2006.01) | |
| *C21D 1/74* | (2006.01) | |
| *C21D 8/12* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/08* | (2006.01) | |
| *C22C 38/12* | (2006.01) | |
| *C22C 38/14* | (2006.01) | |
| *C22C 38/16* | (2006.01) | |
| *C22C 38/60* | (2006.01) | |

(52) U.S. Cl.
CPC ........... *H01F 1/14783* (2013.01); *C21D 1/74* (2013.01); *C21D 8/1222* (2013.01); *C21D 8/1233* (2013.01); *C21D 8/1261* (2013.01); *C21D 8/1266* (2013.01); *C21D 8/1277* (2013.01); *C21D 9/46* (2013.01); *C22C 38/001* (2013.01); *C22C 38/002* (2013.01); *C22C 38/004* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/60* (2013.01); *C22C 2202/02* (2013.01)

(58) Field of Classification Search
None
See application file for complete search history.

(56) References Cited

U.S. PATENT DOCUMENTS

| | | | |
|---|---|---|---|
| 6,542,869 B1 | 4/2003 | Foote | |
| 2020/0040423 A1* | 2/2020 | Natori | ..................... C22C 38/02 |
| 2021/0343458 A1 | 11/2021 | Yashiki et al. | |

FOREIGN PATENT DOCUMENTS

| | | | | |
|---|---|---|---|---|
| CN | 104480386 A | | 4/2015 | |
| EP | 3435520 A1 * | | 1/2019 | ............. C21D 6/005 |
| JP | 2001-295003 A | | 10/2001 | |
| JP | 2002-14691 A | | 1/2002 | |
| JP | 2005307258 A * | | 11/2005 | ............... C21D 8/12 |
| JP | J.P2010-90474 A | | 4/2010 | |
| JP | 2013-91837 A | | 5/2013 | |
| JP | 2019183228 A * | | 10/2019 | ............... C21D 8/12 |
| JP | 2020020005 A * | | 2/2020 | ............... C21D 8/12 |
| KR | 20130076546 A * | | 7/2013 | ........... C22C 38/008 |

(Continued)

OTHER PUBLICATIONS

Fujikura—JP 2005-307258 A—MT—steel sheet w- magnetic flux density in directions—2005 (Year: 2005).*
Bae—KR 2013-0076546 A—PCT D6—MT—steel sheet—2013 (Year: 2013).*
Ichie—JP 2019-183228 A—MT—steel sheet w- angles—2019 (Year: 2019).*
Kawamata—JP 2020-020005 A—PCT D3—MT—method steel—flux density at angles—Feb. 6, 2020 (Year: 2020).*

*Primary Examiner* — John Vincent Lawler
(74) *Attorney, Agent, or Firm* — Birch, Stewart, Kolasch & Birch, LLP

(57) ABSTRACT

This non-oriented electrical steel sheet includes a base material having a chemical composition containing, by mass %, C: 0 to 0.0050%, Si: 3.8 to 4.9%, Mn: 0.05 to 1.20%, sol. Al: more than 0.02% and 0.50% or less, P: 0 to 0.030%, S: 0 to 0.0030%, N: 0 to 0.0030%, Ti: 0% or more and less than 0.0050%, Nb: 0% or more and less than 0.0050%, Zr: 0% or more and less than 0.0050%, V: 0% or more and less than 0.0050%, Cu: 0% or more and less than 0.200%, Ni: 0% or more and less than 0.500%, Sn: 0 to 0.100%, Sb: 0 to 0.100%, and the balance: Fe and impurities, wherein the non-oriented electrical steel sheet satisfies [4.3≤Si+sol. Al+0.5×Mn≤5.0], [$B_{50}(0°)-B_{50}(45°)≤0.16$], and [$B_{50}(0°)+2×B_{50}(45°)+B_{50}(90°)/4≥1.57$], and has tensile strength of 580 MPa or greater.

10 Claims, No Drawings

(56) References Cited

FOREIGN PATENT DOCUMENTS

| | | |
|---|---|---|
| WO | WO 2019/017426 A1 | 1/2019 |
| WO | WO 2020/091039 A1 | 5/2020 |

\* cited by examiner

NON-ORIENTED ELECTRICAL STEEL SHEET AND MANUFACTURING METHOD THEREFOR

TECHNICAL FIELD

The present invention relates to a non-oriented electrical steel sheet and a manufacturing method therefor.

Priority is claimed on Japanese Patent Application No. 2021-023510, filed Feb. 17, 2021, the content of which is incorporated herein by reference.

BACKGROUND ART

In recent years, global environmental issues have attracted attention, and demands for measures toward energy-saving have further increased. Among the demands for measures toward energy-saving, there is a strong demand for higher efficiency of electrical devices. For this reason, for non-oriented electrical steel sheets, which are widely used as iron core materials for motors, generators, and the like, there is a growing demand for improved magnetic characteristics. This tendency is conspicuous in drive motors for electric vehicles and hybrid vehicles and in compressor motors for air conditioners.

Motor cores of the various motors described above are each configured of a stator serving as a fixed element, and a rotor serving as a rotating element. Characteristics required for a stator and a rotor that constitute a motor core are different from each other. A stator is required to have exceptional magnetic characteristics (low iron loss and high magnetic flux density), especially low iron loss, and a rotor is required to have exceptional mechanical characteristics (high strength).

Since characteristics required for a stator and a rotor are different from each other, desired characteristics can be achieved by separately producing a non-oriented electrical steel sheet for a stator and a non-oriented electrical steel sheet for a rotor. However, preparing two types of non-oriented electrical steel sheets causes a decrease in yield. Thus, in order to achieve high strength required for a rotor and low iron loss required for a stator without stress relief annealing, studies on non-oriented electrical steel sheets having exceptional strength and exceptional magnetic characteristics have been ongoing.

For example, Patent Documents 1 and 2 describe attempts to achieve high strength and good magnetic characteristics.

CITATION LIST

Patent Document

[Patent Document 1]
PCT International Publication No. WO 2019/017426
[Patent Document 2]
PCT International Publication No. WO 2020/091039
[Patent Document 3]
Japanese Unexamined Patent Application, First Publication No. 2013-91837
[Patent Document 4]
Japanese Unexamined Patent Application, First Publication No. 2002-14691
[Patent Document 5]
Japanese Unexamined Patent Application, First Publication No. 2001-295003

SUMMARY OF THE INVENTION

Problems to be Solved by the Invention

However, in order to realize a non-oriented electrical steel sheet that achieves both high strength and low iron loss, as disclosed in Patent Documents 1 and 2, it is necessary to contain a large amount of alloying elements, and thus there is a problem that toughness is lowered and fracturing is likely to occur during cold rolling. Further, in Patent Document 1, in the case of requiring sufficiently low iron loss for the stator, stress relief annealing is additionally necessary.

The present invention has been made to solve such problems, and an object of the present invention is to stably provide a non-oriented electrical steel sheet having high strength and exceptional magnetic characteristics.

Means for Solving the Problem

The gist of the present invention is the following non-oriented electrical steel sheet and manufacturing method therefor.

(1) A non-oriented electrical steel sheet according to an embodiment of the present invention includes a base material having a chemical composition containing, by mass %, C: 0 to 0.0050%,
Si: 3.8 to 4.9%,
Mn: 0.05 to 1.20%,
sol. Al: more than 0.02% and 0.50% or less,
P: 0 to 0.030%,
S: 0 to 0.0030%,
N: 0 to 0.0030%,
Ti: 0% or more and less than 0.0050%,
Nb: 0% or more and less than 0.0050%,
Zr: 0% or more and less than 0.0050%,
V: 0% or more and less than 0.0050%,
Cu: 0% or more and less than 0.200%,
Ni: 0% or more and less than 0.500%,
Sn: 0 to 0.100%,
Sb: 0 to 0.100%, and
the balance: Fe and impurities,
wherein the non-oriented electrical steel sheet satisfies the following expressions (i) to (iii), and has tensile strength of 580 MPa or greater, $$4.3 \leq Si + sol.\ Al + 0.5 \times Mn \leq 5.0 \qquad (i)$$

where element symbols in the above expression (i) are amounts (by mass %) of each element, $$B_{50}(0°) - B_{50}(45°) \leq 0.16 \qquad (ii)$$

$$B_{50}(0°) + 2 \times B_{50}(45°) + B_{50}(90°))/4 \geq 1.57 \qquad (iii)$$

where $B_{50}(0°)$ in the above expressions (ii) and (iii) is magnetic flux density (T) at a magnetizing force of 5000 A/m in a rolling direction, $B_{50}(45°)$ is magnetic flux density (T) at a magnetizing force of 5000 A/m in a direction of 45° from the rolling direction, and $B_{50}(90°)$ is magnetic flux density (T) at a magnetizing force of 5000 A/m in a direction of 90° from the rolling direction.

(2) In the non-oriented electrical steel sheet described in the above (1), the chemical composition may contain one or two elements selected from, by mass %, Sn: 0.005 to 0.100%, and Sb: 0.005 to 0.100%.

(3) The non-oriented electrical steel sheet according to the above (1) or (2) may include an insulating coating on a surface of the base material.

(4) A method for manufacturing a non-oriented electrical steel sheet according to another embodiment of the present invention is a method for manufacturing the non-oriented electrical steel sheet according to any one of the above (1) to (3), comprising performing in order:

for a steel ingot having a chemical composition containing, by mass %,
C: 0 to 0.0050%,
Si: 3.8 to 4.9%,
Mn: 0.05 to 1.20%,
sol. Al: more than 0.02% and 0.50% or less,
P: 0 to 0.030%,
S: 0 to 0.0030%,
N: 0 to 0.0030%,
Ti: 0% or more and less than 0.0050%,
Nb: 0% or more and less than 0.0050%,
Zr: 0% or more and less than 0.0050%,
V: 0% or more and less than 0.0050%,
Cu: 0% or more and less than 0.200%,
Ni: 0% or more and less than 0.500%,
Sn: 0 to 0.100%,
Sb: 0 to 0.100%, and
the balance: Fe and impurities,
the chemical composition satisfying the following expression (i),
a hot rolling step;
a primary cold rolling step of reducing a sheet thickness to 1.0 mm or less;
an intermediate annealing step with a soaking temperature of 800 to 1050° C. and a soaking time of 1 to 300 sec;
a secondary cold rolling step with a rolling reduction of 65% or more and less than 85%; and
a finish annealing step with an annealing temperature of 850 to 1050° C., $$4.3 \leq Si + sol.\ Al + 0.5 \times Mn \leq 5.0 \quad (i)$$

where element symbols in the above expression (i) are amounts (by mass %) of each element.

Effects of the Invention

According to the embodiment of the present invention, it is possible to stably obtain a non-oriented electrical steel sheet having high strength and exceptional magnetic characteristics.

EMBODIMENT(S) FOR IMPLEMENTING THE INVENTION

In order to solve the above problems, the present inventors have obtained the following findings as a result of intensive studies.

Si, Mn, and sol. Al are elements that have an effect of increasing electrical resistance of steel and reducing eddy current loss. In addition, these elements are elements that also contribute to increasing the strength of steel.

Among Si, Mn, and sol. Al, Si is an element that most efficiently contributes to an increase in electrical resistance and strength. After Si, sol. Al has the next best effect of increasing electrical resistance and strength. On the other hand, Mn is slightly less effective in increasing electrical resistance and strength than Si and sol. Al.

For these reasons, in the present embodiment, by adjusting Si, sol. Al, and Mn contents within appropriate ranges, higher strength and improved magnetic characteristics are achieved.

Next, improvement of toughness during cold rolling of a steel sheet containing a large amount of the above Si, sol. Al, and Mn was studied.

In known techniques, when a large amount of alloying elements such as Si, sol. Al, and Mn are contained in steel in order to increase the strength of the steel, toughness is lowered, and as a result, there is a problem that fracturing is likely to occur during cold rolling. Thus, the present inventors have made intensive studies on improving toughness during cold rolling of a steel sheet containing a large amount of alloying elements (high alloy steel) and have found that, by omitting hot-rolled sheet annealing, fracturing during cold rolling can be inhibited even for high alloy steel. Specifically, the present inventors have understood that, by performing pickling on an unannealed hot-rolled sheet, then performing primary cold rolling to obtain a sheet thickness of 1 mm or less, then performing intermediate annealing, and then performing secondary cold rolling, toughness during double cold rolling can be ensured even for high alloy steel.

The double cold rolling method has been studied before. For example, Patent Documents 3 to 5 describe attempts to achieve good magnetic characteristics and high strength.

However, with the means disclosed in Patent Document 3, Goss orientation {110}<001> is remarkably developed, and magnetic flux density $B_{50}$ in a rolling direction is good, but anisotropy of $B_{50}$ becomes excessively large. When an electromagnetic steel sheet with large anisotropy of $B_{50}$ is used for a motor core, there is a problem that smooth rotation of a motor is hindered. The means disclosed in Patent Document 4 is not satisfactory from the viewpoint of increasing strength because the Si, Mn, and sol. Al contents are low. With the means disclosed in Patent Document 5, anisotropy of $B_{50}$ can be reduced, but since it is necessary to increase a rolling reduction in final cold rolling to 85% or more, it is necessary to thicken a sheet thickness at the start of the final cold rolling, resulting in insufficient toughness, and when the Si content is large, there is a risk of fracturing during rolling.

Thus, the present inventors have found as a result of further studies that, in order to realize a non-oriented electrical steel sheet that has exceptional toughness during cold rolling, high strength, good magnetic characteristics, and small anisotropy of $B_{50}$ as well, it is important to appropriately control the sol. Al content, a sheet thickness at the start of the secondary cold rolling, and a rolling reduction in the secondary cold rolling.

The present invention has been made based on the above findings. A preferred embodiment of the present invention will be described in detail below. However, the present invention is not limited to the configuration disclosed in the present embodiment, and various modifications can be made without departing from the gist of the present invention.

1. Overall Configuration

Since a non-oriented electrical steel sheet according to the present embodiment has high strength and exceptional magnetic characteristics, it is suitable for both a stator and a rotor. In manufacturing of the non-oriented electrical steel sheet according to the present embodiment, toughness during cold rolling is exceptional, and fracturing during rolling can be inhibited, and thus stable manufacturing is possible. Also, the non-oriented electrical steel sheet according to the present embodiment preferably has an insulating coating on a surface of a base material (a silicon steel sheet) described below.

2. Chemical Composition of Base Material

In a chemical composition of the base material of the non-oriented electrical steel sheet according to the present embodiment, reasons for limiting each element are as follows. Also, "%" in contents in the following description is "mass %". A numerical limitation range described with "to" includes lower and upper limits thereof.

C: 0 to 0.0050%

C (carbon) is an element that causes iron loss deterioration of the non-oriented electrical steel sheet. If the C content exceeds 0.0050%, iron loss of the non-oriented electrical steel sheet deteriorates, making it impossible to obtain good magnetic characteristics. Accordingly, the C content is set to 0.0050% or less. The C content is preferably 0.0040% or less, more preferably 0.0035% or less, and most preferably 0.0030% or less. The C content may be 0%. However, since it is difficult to make the C content 0% in a practical steel sheet in terms of manufacturing, the C content may be more than 0%. In addition, C contributes to increasing strength of the non-oriented electrical steel sheet, and thus, in order to obtain such an effect, the C content is preferably 0.0005% or more, and more preferably 0.0010% or more.

Si: 3.8 to 4.9%

Si (silicon) is an element that increases electrical resistance of steel to reduce eddy current loss and improves high-frequency iron loss of the non-oriented electrical steel sheet. In addition, since Si has a large solid-solution strengthening ability, it is an effective element for increasing strength of the non-oriented electrical steel sheet. In order to obtain these effects, the Si content is set to 3.8% or more. The Si content is preferably 3.9% or more, more preferably over 4.0%, and most preferably 4.1% or more. On the other hand, if the Si content is excessive, workability deteriorates significantly, making cold rolling difficult. Accordingly, the Si content is set to 4.9% or less. The Si content is preferably 4.8% or less, and more preferably 4.7% or less.

Mn: 0.05 to 1.20%

Mn (manganese) is an effective element for increasing electrical resistance of steel to reduce eddy current loss and improving high-frequency iron loss of the non-oriented electrical steel sheet. In addition, in a case in which the Mn content is too low, the effect of increasing electrical resistance is small, and fine sulfides (MnS) are precipitated in steel, which may result in insufficient grain growth during finish annealing. For that reason, the Mn content is set to 0.05% or more. The Mn content is preferably 0.20% or more, more preferably 0.23% or more, and most preferably 0.40% or more. On the other hand, if the Mn content is excessive, a decrease in magnetic flux density of the non-oriented electrical steel sheet becomes significant. Accordingly, the Mn content is set to 1.20% or less. The Mn content is preferably 1.10% or less, and more preferably 1.00% or less.

Sol. Al: More Than 0.02% and 0.50% or Less

Sol. Al (aluminum) is an element that has an effect of reducing eddy current loss by increasing electrical resistance of steel and improving high-frequency iron loss of the non-oriented electrical steel sheet. In addition, sol. Al is an element that contributes to increasing strength of the non-oriented electrical steel sheet by solid-solution strengthening, although not as much as Si. In order to obtain these effects, the sol. Al content is more than 0.02%. The sol. Al content is preferably 0.05% or more, 0.10% or more, or 0.15% or more, and more preferably 0.20% or more. On the other hand, if the sol. Al content is excessive, anisotropy of magnetic flux density of the non-oriented electrical steel sheet increases. Accordingly, the sol. Al content is 0.50% or less. The sol. Al content is preferably 0.45% or less, more preferably 0.40% or less, and most preferably 0.35% or less.

Also, in the present embodiment, sol. Al is acid-soluble Al and indicates solid-solution Al present in steel in a solid-solution state.

In the present embodiment, electrical resistance of steel is ensured by appropriately controlling the Si, sol. Al, and Mn contents. Also, from the viewpoint of ensuring strength, it is required to appropriately control the Si, sol. Al, and Mn contents. On the other hand, from the viewpoint of ensuring magnetic flux density and toughness, an upper limit of the total amount of Si, sol. Al, and Mn is also required. For that reason, the Si, sol. Al, and Mn contents are required to satisfy the following expression (i) in addition to being within the respective ranges described above. From the viewpoint of ensuring electrical resistance and strength of steel, a value of the middle of the following expression (i) is preferably 4.4 or more, and more preferably 4.5 or more. On the other hand, from the viewpoint of securing magnetic flux density and toughness of steel, the value of the middle of the following expression (i) is preferably 4.9 or less, and more preferably 4.8 or less.

$$4.3 \leq \text{Si} + sol.\, Al + 0.5 \times \text{Mn} \leq 5.0 \qquad (i)$$

Here, element symbols in the above expression (i) are amounts (by mass %) of each element.

P: 0 to 0.030%

P (phosphorus) is contained in steel as an impurity, and if the content is excessive, toughness of the non-oriented electrical steel sheet is significantly lowered. Accordingly, the P content is set to 0.030% or less. The P content is preferably 0.025% or less, and more preferably 0.020% or less. The P content may be 0%. Also, since an extreme reduction in the P content may cause an increase in manufacturing cost, the P content is preferably 0.003% or more, and more preferably 0.005% or more.

S: 0 to 0.0030%

S (sulfur) is an element that increases iron loss by forming fine MnS precipitates and deteriorates magnetic characteristics of the non-oriented electrical steel sheet. Accordingly, the S content is set to 0.0030% or less. The S content is preferably 0.0020% or less, more preferably 0.0018% or less, and most preferably 0.0015% or less. The S content may be 0%. Also, since an extreme reduction in the S content may cause an increase in manufacturing cost, the S content is preferably 0.0001% or more, more preferably 0.0003% or more, and most preferably 0.0005% or more.

N: 0 to 0.0030%

N (nitrogen) is an element that is inevitably mixed in steel, and is an element that forms nitrides, which increase iron loss, and deteriorates magnetic characteristics of the non-oriented electrical steel sheet. Accordingly, the N content is set to 0.0030% or less. The N content is preferably 0.0025% or less, and more preferably 0.0020% or less. The N content may be 0%. Also, since an extreme reduction in the N content may cause an increase in manufacturing cost, the N content is preferably 0.0005% or more.

Ti: 0% or More and Less Than 0.0050%

Ti (titanium) is an element that is inevitably mixed in steel, and may combine with carbon or nitrogen to form precipitates (carbides or nitrides). In a case in which carbides or nitrides are formed, these precipitates themselves deteriorate magnetic characteristics of the non-oriented electrical steel sheet. Further, carbides or nitrides inhibit growth of grains during finish annealing, deteriorating magnetic characteristics of the non-oriented electrical steel sheet. Accordingly, the Ti content is set to less than 0.0050%. The Ti content is preferably 0.0040% or less, more preferably 0.0030% or less, and most preferably 0.0020% or less. The Ti content may be 0%. Also, since an extreme reduction in the Ti content may cause an increase in manufacturing cost, the Ti content is preferably 0.0005% or more.

Nb: 0% or More and Less Than 0.0050%

Nb (niobium) is an element that combines with carbon or nitrogen to form precipitates (carbides or nitrides), thereby contributing to increased strength, but these precipitates themselves deteriorate magnetic characteristics of the non-oriented electrical steel sheet. Accordingly, the Nb content is set to less than 0.0050%. The Nb content is preferably 0.0040% or less, more preferably 0.0030% or less, and even more preferably 0.0020% or less. Further, the Nb content is most preferably below a measurement limit, and in particular, less than 0.0001%. Since it is desirable that the Nb content be as low as possible, the Nb content may be 0%.

Zr: 0% or More and Less Than 0.0050%

Zr (zirconium) is an element that combines with carbon or nitrogen to form precipitates (carbides or nitrides), thereby contributing to increased strength, but these precipitates themselves deteriorate magnetic characteristics of the non-oriented electrical steel sheet. Accordingly, the Zr content is set to less than 0.0050%. The Zr content is preferably 0.0040% or less, more preferably 0.0030% or less, and even more preferably 0.0020% or less. Also, the Zr content is most preferably below a measurement limit, and in particular, less than 0.0001%. Since it is desirable that the Zr content be as low as possible, the Zr content may be 0%.

V: 0% or More and Less Than 0.0050%

V (vanadium) is an element that combines with carbon or nitrogen to form precipitates (carbides or nitrides), thereby contributing to increased strength, but these precipitates themselves deteriorate magnetic characteristics of the non-oriented electrical steel sheet. Accordingly, the V content is set to less than 0.0050%. The V content is preferably 0.0040% or less, more preferably 0.0030% or less, and even more preferably 0.0020% or less. The V content is most preferably below a measurement limit, and in particular, less than 0.0001%. Since it is desirable that the V content be as low as possible, the V content may be 0%.

Cu: 0% or More and Less Than 0.200%

Cu (copper) is an element that is unavoidably mixed in steel. Intentional inclusion of Cu increases the manufacturing cost of the non-oriented electrical steel sheet. Accordingly, in the present embodiment, Cu does not have to be actively contained, and may be contained at an impurity level. The Cu content is set to less than 0.200%, which is the maximum value that can be unavoidably mixed in a manufacturing process. The Cu content is preferably 0.150% or less, and more preferably 0.100% or less. The Cu content may be 0%. Also, although a lower limit of the Cu content is not particularly limited, an extreme reduction in the Cu content may cause an increase in manufacturing cost. For that reason, the Cu content is preferably 0.001% or more, more preferably 0.003% or more, and most preferably 0.005% or more.

Ni: 0% or More and Less Than 0.500%

Ni (nickel) is an element that is unavoidably mixed in steel. However, since Ni is also an element that improves the strength of the non-oriented electrical steel sheet, it may be contained intentionally. However, since Ni is expensive, the Ni content is set to less than 0.500%. The Ni content is preferably 0.400% or less, and more preferably 0.300% or less. The Ni content may be 0%. Also, although a lower limit of the Ni content is not particularly limited, an extreme reduction in the Ni content may cause an increase in manufacturing cost. For that reason, the Ni content is preferably 0.001% or more, more preferably 0.003% or more, and most preferably 0.005% or more.

Sn: 0 to 0.100%

Sb: 0 to 0.100%

Sn (tin) and Sb (antimony) are useful elements that segregate on the surface of the base material to inhibit oxidation and nitridation during annealing, thereby contributing to ensuring low iron loss of the non-oriented electrical steel sheet. In addition, Sn and Sb also have an effect of improving textures by segregating at grain boundaries and increasing magnetic flux density of the non-oriented electrical steel sheet. For that reason, at least one of Sn and Sb may be contained if necessary. However, if the content of these elements is excessive, toughness of steel may decrease, making cold rolling difficult. Accordingly, the Sn and Sb contents are each set to 0.100% or less. The Sn and Sb contents are each preferably 0.060% or less. The Sn and Sb contents may each be 0%. Also, in order to obtain the above effects without fail, the content of at least one of Sn and Sb is preferably 0.005% or more, and more preferably 0.010% or more.

In the chemical composition of the base material (silicon steel sheet) of the non-oriented electrical steel sheet according to the present embodiment, the balance is Fe and impurities. Here, the term "impurities" are components mixed in by various factors in raw materials such as ores, scraps, and a manufacturing process when steel is industrially manufactured, which are permitted within a range that does not adversely affect characteristics of the non-oriented electrical steel sheet according to the present embodiment.

Also, as impurity elements, Cr and Mo contents are not particularly defined in the present embodiment. In the non-oriented electrical steel sheet according to the present embodiment, even if each of these elements is contained in a range of 0.5% or less, there is no particular effect on the characteristics of the non-oriented electrical steel sheet according to the present embodiment. In addition, even if each of Ca and Mg is contained in a range of 0.002% or less, there is no particular effect on the characteristics of the non-oriented electrical steel sheet according to the present embodiment. Even if a rare earth element (REM) is contained in a range of 0.004% or less, there is no particular effect on the characteristics of the non-oriented electrical steel sheet according to the present embodiment. Further, in the present embodiment, REM refers to a total of 17 elements including Sc, Y, and lanthanoids, and the REM content refers to the total amounts of these elements.

Although O is also an impurity element, even if it is contained in a range of 0.05% or less, it does not affect the characteristics of the non-oriented electrical steel sheet according to the present embodiment. O may be mixed into steel in annealing step, and thus even if the content in a slab stage (that is, a ladle value) is in a range of 0.01% or less, there is no particular effect on the characteristics of the non-oriented electrical steel sheet according to the present embodiment.

Also, in addition to the above elements, elements such as Pb, Bi, As, B, and Se may be included as the impurity elements, but if an amount of each is in a range of 0.0050% or less, they do not impair the characteristics of the non-oriented electrical steel sheet according to the present embodiment.

The chemical composition of the base material of the non-oriented electrical steel sheet according to the present embodiment may be measured using ICP emission spectrometry or spark discharge emission spectrometry. Also, C and S may be measured using a combustion-infrared absorption method, N may be measured using an inert gas combustion-thermal conductivity method, and O may be measured using an inert gas fusion-nondispersive infrared absorption method.

In addition, in a case in which the steel sheet serving as a measurement target has an insulating coating and the like, the chemical composition is measured after removing these.

3. Magnetic Characteristics

In the non-oriented electrical steel sheet according to the present embodiment, exceptional magnetic characteristics are that whole circumferential average iron loss $W_{10/400}$ is low, whole circumferential average magnetic flux density $B_{50}$ is high, and anisotropy of $B_{50}$ is small. Also, the iron loss $W_{10/400}$ is iron loss generated under the conditions that the maximum magnetic flux density is 1.0 T and a frequency is 400 Hz, and the magnetic flux density $B_{50}$ is magnetic flux density in a magnetic field of 5000 A/m.

A whole circumferential average characteristic is an average value of a characteristic in the rolling direction, a characteristic in a direction of 45° from the rolling direction, and a characteristic in a direction of 90° from the rolling direction and is as follows. In addition, the direction 90° from the rolling direction is a direction perpendicular to the rolling direction in a sheet plane (that is, a direction perpendicular to the rolling direction and a sheet thickness direction).

Whole Circumferential Average $$W_{10/400} = (W_{10/400}(0°) + 2 \times W_{10/400}(45°) + W_{10/400}(90°))/4$$

Whole circumferential average $B_{50}=(B_{50}(0°)+2\times B_{50}(45°)+B_{50}(90°))/4$ Further, the anisotropy of $B_{50}$ is represented by $\Delta B_{50}$ in the present specification and is as follows.

$$\Delta B_{50} = B_{50}(0°) - B_{50}(45°)$$

Specifically, the fact that iron loss is exceptional indicates a case in which, when a sheet thickness of the non-oriented electrical steel sheet is more than 0.30 mm and less than or equal to 0.35 mm, the whole circumferential average $W_{10/400}$ is less than or equal to 16.0 W/kg, a case in which, when the sheet thickness is more than 0.25 mm and 0.30 mm or less, the whole circumferential average $W_{10/400}$ is 15.0 W/kg or less, a case in which, when the sheet thickness is more than 0.20 mm and 0.25 mm or less, the whole circumferential average $W_{10/400}$ is 13.0 W/kg or less, and a case in which, when the thickness is 0.20 mm or less, the whole circumferential average $W_{10/400}$ is 12.0 W/kg or less, the $\Delta B_{50}$ is 0.16 T or less regardless of the sheet thickness, and the whole circumferential average $B_{50}$ is 1.57 T or more. Here, in the present embodiment, the magnetic characteristics (the iron loss $W_{10/400}$ and the magnetic flux density $B_{50}$) are measured by the Epstein test specified in JIS C 2550-1 (2011) using magnetic measurement test pieces in each direction.

4. Mechanical Characteristics

In the non-oriented electrical steel sheet according to the present embodiment, having high strength indicates that tensile (maximum) strength in the rolling direction is 580 MPa or more. The non-oriented electrical steel sheet according to the present embodiment has tensile strength of 580 MPa or more. The tensile strength is preferably 590 MPa or more. Here, the tensile strength is measured by performing a tensile test based on JIS Z 2241 (2011).

According to the non-oriented electrical steel sheet according to the present embodiment, it is possible to achieve both high strength and exceptional magnetic characteristics (in particular, reduction in anisotropy of $B_{50}$ ($\Delta B_{50}$)). This is something that could not be achieved by simple high alloying as in the past. In the present embodiment, in addition to optimizing the total content of alloying elements that contribute to strength (expression (i)), by controlling conditions of a manufacturing method, which will be described later (in particular, a secondary cold rolling step and a finish annealing step), the non-oriented electrical steel sheet having both high strength and exceptional magnetic characteristics can be achieved.

For that reason, the non-oriented electrical steel sheet of the present embodiment can be suitably used as an iron core material for rotating machines such as drive motors and generators for electric vehicles and hybrid vehicles, and compressor motors for air conditioners and large air conditioners.

5. Insulating Coating

The non-oriented electrical steel sheet according to the present embodiment preferably has the insulating coating on the surface of the base material. The non-oriented electrical steel sheet is used by punching core blanks and then stacking them, and thus, by providing the insulating coating on the surface of the base material, eddy currents between sheets can be reduced, and eddy current loss can be reduced as a core.

In the present embodiment, a type of insulating coating is not particularly limited, and it is possible to use a known insulating coating used as the insulating coating for the non-oriented electrical steel sheet. As such an insulating coating, for example, a composite insulating coating containing an inorganic substance as a main component and an organic substance can be exemplified.

Here, the composite insulating coating is, for example, an insulating coating that contains at least either a metal salt such as a metal chromate or a metal phosphate, or an inorganic substance such as colloidal silica, a Zr compound, or a Ti compound as a main component, in which fine organic resin particles are dispersed. In particular, from the viewpoint of reducing an environmental impact during manufacturing, which has been in increasing demand in recent years, an insulating coating using a coupling agent of a metal phosphate, Zr, or Ti as a starting material, or an insulating coating using a carbonate or an ammonium salt of a coupling agent of a metal phosphate, Zr, or Ti as a starting material is preferably used.

Although an adhesion amount of the insulating coating is not particularly limited, it is preferably about 200 to 1500 mg/m² per side, and more preferably 300 to 1200 mg/m² per side. By forming the insulating coating such that the adhesion amount is within the above range, exceptional uniformity can be maintained. In addition, in the case of measuring the adhesion amount of the insulating coating after the fact, various known measurement methods can be used, and, for example, a method for measuring a difference in mass between before and after immersion in an aqueous sodium hydroxide solution, a fluorescent X-ray method using a calibration curve method, or the like may be used as appropriate.

Although the non-oriented electrical steel sheet according to the present embodiment has been described above, an average grain size of the non-oriented electrical steel sheet according to the present embodiment is not particularly limited. However, if the average crystal grain size becomes too small without coarsening crystal grains, there is a concern that the iron loss will deteriorate. On the other hand, if the crystal grains are excessively coarsened and the average crystal grain size is too large, not only the strength is lowered, but also the eddy current loss may deteriorate. For that reason, the average grain size of the non-oriented electrical steel sheet is preferably set to 50 μm to 120 μm. The average crystal grain size may be set to 60 μm or more or may be set to 70 μm or more. Also, the average crystal grain size may be set to 100 μm or less.

The average grain size can be measured, for example, by the cutting method of JIS G0551 (2020) in a cross-section parallel to the rolling direction and sheet thickness direction.

Also, the thickness of the non-oriented electrical steel sheet according to the present embodiment is not particularly limited. Normally, as the sheet thickness becomes smaller, the iron loss decreases, but the manufacturing cost increases. In consideration of this point, if the sheet thickness is 0.10 mm or more, the iron loss can be kept lower, and the cost increase can be inhibited. Also, if the sheet thickness is 0.35 mm or less, low iron loss can be maintained. For that reason, a preferred sheet thickness of the non-oriented electrical steel sheet according to the present embodiment is 0.10 to 0.35 mm, and more preferably 0.15 to 0.30 mm.

6. Manufacturing Method

Although a manufacturing method of the non-oriented electrical steel sheet according to the present embodiment is not particularly limited, it can be manufactured by carrying out in order, for a steel ingot having the chemical composition described above, for example, a hot rolling step, a pickling step, a primary cold rolling step, an intermediate annealing step, a secondary cold rolling step, and a finish annealing step under the conditions shown below. Further, in a case in which the insulating coating is formed on the surface of the base material (silicon steel sheet), the insulating coating forming step is performed after the finish annealing step. Each step will be described in detail below.

<Hot Rolling Step>

A steel ingot (slab) having the above chemical composition is heated, and hot rolling is performed on the heated steel ingot to obtain a hot-rolled steel sheet. Here, a heating temperature of the steel ingot for the hot rolling is not particularly specified but is preferably 1050 to 1250° C., for example. Also, the thickness of the hot-rolled steel sheet after hot rolling is not particularly specified, but in consideration of efficiency of the hot rolling and subsequent steps, for example, it is preferably about 1.5 to 3.0 mm.

<Pickling Step>

After the hot rolling step, pickling is performed without annealing the hot-rolled sheet. In general, after the hot rolling step, the hot-rolled sheet is annealed and then pickled in many cases. However, in the case of steel containing a large amount of alloying elements as in the present embodiment, if hot-rolled sheet annealing is performed thereon, toughness may deteriorate, and fracturing may occur during cold rolling. For that reason, hot-rolled sheet annealing is omitted in the present embodiment. Specifically, the pickling is performed on the hot-rolled sheet without annealing, and a scale layer formed on the surface of the base material is removed. Here, pickling conditions such as a concentration of an acid used for pickling, a concentration of an accelerator used for pickling, and a temperature of a pickling solution are not particularly limited and known pickling conditions can be used.

<Primary Cold Rolling Step>

After pickling, a sheet thickness thereof is reduced to 1.0 mm or less. If the sheet thickness after reduction exceeds 1.0 mm, there is a high risk of fracturing during secondary cold rolling. The sheet thickness after reduction is more preferably 0.9 mm or less, and most preferably 0.8 mm or less.

<Intermediate Annealing Step>

After the primary cold rolling, intermediate annealing is performed for the purpose of improving the magnetic characteristics of the non-oriented electrical steel sheet. Regarding heat treatment conditions in the intermediate annealing, the primarily cold-rolled sheet is annealed at 800 to 1050° C. for 1 to 300 seconds. If a soaking temperature in the intermediate annealing is too low, the whole circumferential average magnetic flux density $B_{50}$ may decrease. For that reason, the soaking temperature in the intermediate annealing is set to 800° C. or higher, preferably 850° C. or higher, and more preferably 900° C. or higher. On the other hand, if the soaking temperature in intermediate annealing is too high, there is a risk of fracturing during secondary cold rolling. For that reason, the soaking temperature in the intermediate annealing is set to 1050° C. or lower, preferably 1040° C. or lower, and more preferably 1030° C. or lower. Moreover, if a soaking time in the intermediate annealing is too short, the whole circumferential average magnetic flux density $B_{50}$ may decrease. For that reason, the soaking time in the intermediate annealing is set to 1 second or longer, preferably 5 seconds or longer, and more preferably 10 seconds or longer. On the other hand, if the soaking time in the intermediate annealing is too long, the manufacturing cost may increase. Accordingly, the soaking time in the intermediate annealing is 300 seconds or less, preferably 200 seconds or less, and more preferably 100 seconds or less. Also, before the intermediate annealing, rolling oil during the primary cold rolling remains, and thus it is preferable to perform a degreasing treatment.

<Secondary Cold Rolling Step>

After the intermediate annealing, secondary cold rolling is performed. In the secondary cold rolling, the base material is rolled at a rolling reduction of 65% or more and less than 85% so that the final sheet thickness of the base material is 0.10 to 0.35 mm. If the rolling reduction in the secondary cold rolling is too low, the anisotropy ($\Delta B_{50}$) of the magnetic flux density $B_{50}$ may increase. Moreover, if the rolling reduction in the secondary cold rolling is excessively lowered, the iron loss may deteriorate. For that reason, the rolling reduction in the secondary cold rolling is preferably 67% or more. On the other hand, if the rolling reduction in secondary cold rolling is too high, the sheet thickness at the start of rolling increases and there is a risk of fracturing. For that reason, the rolling reduction in the secondary cold rolling is preferably 83% or less. In addition, in a case in which the intermediate annealing is performed in an oxidizing atmosphere, it is preferable to perform the secondary cold rolling after removing scales.

<Finish Annealing Step>

After the secondary cold rolling, finish annealing is performed. In the method for manufacturing a non-oriented electrical steel sheet according to the present embodiment, it is preferable to use a continuous annealing furnace for the finish annealing.

Here, regarding finish annealing conditions, a soaking temperature (annealing temperature) is set to 850 to 1050° C. Also, as other conditions for the finish annealing step, it is preferable that a soaking time be set to 1 to 300 seconds, an atmosphere be set to a mixed atmosphere of $H_2$ and $N_2$ in which a proportion of $H_2$ is 5 to 100% by volume (that is, $H_2+N_2=100\%$ by volume), and a dew point of the atmosphere be set to 30° C. or lower.

In a case in which the soaking temperature is less than 850° C., the crystal grain size becomes finer and the iron loss of the non-oriented electrical steel sheet deteriorates, which is not preferable. In a case in which the soaking temperature exceeds 1050° C., the strength of the non-oriented electrical steel sheet will be insufficient, resulting in an increase in manufacturing cost, which is not preferable. The soaking temperature is more preferably 875 to 1025° C., and most preferably 900 to 1000° C. If the soaking time is less than 1 second, the crystal grains cannot be sufficiently coarsened. If the soaking time exceeds 300 seconds, the manufacturing cost will increase. The proportion of $H_2$ in the atmosphere is more preferably 10 to 90% by volume. The dew point of the atmosphere is preferably as low as possible from the viewpoint of increasing the magnetic flux density. The dew point of the atmosphere is more preferably 10° C. or lower, even more preferably 0° C. or lower, and most preferably -10° C. or lower.

<Insulating Coating Forming Step>

After the finish annealing, an insulating coating forming step is carried out, if necessary. Here, a method for forming the insulating coating is not particularly limited, and coating and drying of a treatment liquid may be performed by a known method using a known treatment liquid for forming an insulating coating as shown below. As a known insulating coating, for example, a composite insulating coating that contains an inorganic substance as a main component and further contains an organic substance can be exemplified.

The composite insulating coating is, for example, an insulating coating that contains at least either a metal salt such as a metal chromate or a metal phosphate, or an inorganic substance such as colloidal silica, a Zr compound, or a Ti compound as a main component, in which fine organic resin particles are dispersed. In particular, from the viewpoint of reducing an environmental impact during manufacturing, which has been in increasing demand in recent years, an insulating coating using a coupling agent of a metal phosphate, Zr, or Ti as a starting material, or an insulating coating using a carbonate or an ammonium salt of a coupling agent of a metal phosphate, Zr, or Ti as a starting material is preferably used.

The surface of the base material on which the insulating coating is formed may be subjected to arbitrary pretreatments such as degreasing treatment with an alkali, and pickling treatment with a hydrochloric acid, a sulfuric acid, a phosphoric acid, or the like before applying the treatment liquid. The treatment liquid may be applied to the surface of the base material after the finish annealing without performing these pretreatments.

The present invention will be described in more detail below with reference to examples, but the conditions in the examples are merely examples adopted to confirm feasibility and effects of the present invention, and the present invention is not limited to these example conditions. Various conditions can be adopted in the present invention as long as the objects of the present invention are achieved without departing from the gist of the present invention.

Example 1

A slab having the chemical composition shown in Table 1 was heated to 1150° C., then hot-rolled at a finishing temperature of 850° C. and a finishing sheet thickness of 2.0 mm, and coiled at 650° C. to obtain a hot-rolled steel sheet. The obtained hot-rolled steel sheet was subjected to the primary cold rolling to have a thickness of 0.7 mm after removing surface scales by pickling without performing hot-rolled sheet annealing. Next, the steel sheet after the primary cold rolling was degreased, then subjected to the intermediate annealing at 970° C. for 40 seconds to obtain an intermediate-annealed sheet. The intermediate-annealed sheet was subjected to the secondary cold rolling have a thickness of 0.20 mm to obtain a cold-rolled steel sheet. Further, the finish annealing was performed at 1000° C. for 20 seconds in a mixed atmosphere of $H_2$: 15%, $N_2$: 85%, and a dew point of -30° C. After that, an insulating coating was applied to manufacture a non-oriented electrical steel sheet, which was used for test materials.

In addition, the above insulating coating was formed by applying an insulating coating made of aluminum phosphate and an acrylic-styrene copolymer resin emulsion with a particle size of 0.2 μm to have an adhesion amount of 1000 mg/m² and performing baking at 350° C. in the atmosphere.

TABLE 1

| Test No. | Steel type | C | Si | Mn | P | S | sol. Al | N | Ti | Nb | Zr | V | Cu | Ni | Sn | Sb | Value of middle in expression (i) |
|---|---|---|---|---|---|---|---|---|---|---|---|---|---|---|---|---|---|
| 1 | A | 0.0025 | 3.7 | 1.02 | 0.014 | 0.0008 | 0.31 | 0.0012 | 0.0012 | 0.0008 | 0.0007 | 0.0002 | 0.059 | 0.033 | 0.029 | 0.001 | 4.5 |
| 2 | B | 0.0026 | 3.8 | 1.01 | 0.015 | 0.0009 | 0.32 | 0.0013 | 0.0013 | 0.0008 | 0.0007 | 0.0018 | 0.060 | 0.035 | 0.029 | 0.001 | 4.6 |
| 3 | C | 0.0020 | 4.1 | 0.60 | 0.013 | 0.0008 | 0.20 | 0.0013 | 0.0012 | 0.0009 | 0.0006 | 0.0005 | 0.061 | 0.050 | 0.028 | — | 4.6 |
| 4 | D | 0.0025 | 4.4 | 0.44 | 0.012 | 0.0006 | 0.19 | 0.0015 | 0.0016 | 0.0007 | 0.0004 | 0.0001 | 0.058 | 0.049 | 0.003 | 0.001 | 4.8 |
| 5 | E | 0.0025 | 4.9 | 0.43 | 0.013 | 0.0007 | 0.20 | 0.0015 | 0.0016 | 0.0008 | 0.0004 | 0.0006 | 0.052 | 0.050 | 0.002 | 0.003 | 5.3 |
| 6 | F | 0.0024 | 4.1 | 0.62 | 0.015 | 0.0010 | 0.05 | 0.0014 | 0.0015 | 0.0007 | 0.0011 | 0.0009 | 0.007 | 0.005 | 0.030 | — | 4.5 |
| 7 | G | 0.0018 | 4.7 | 0.20 | 0.015 | 0.0012 | 0.15 | 0.0015 | 0.0015 | 0.0014 | 0.0006 | 0.0009 | 0.009 | 0.006 | 0.028 | 0.002 | 5.0 |
| 8 | H | 0.0028 | 3.8 | 0.20 | 0.013 | 0.0010 | 0.15 | 0.0017 | 0.0012 | 0.0016 | 0.0006 | 0.0001 | 0.005 | 0.005 | 0.030 | 0.002 | 4.1 |
| 9 | I | 0.0025 | 4.0 | 0.61 | 0.013 | 0.0009 | 0.45 | 0.0018 | 0.0012 | 0.0016 | 0.0005 | 0.0001 | 0.006 | 0.006 | 0.030 | — | 4.8 |
| 10 | J | 0.0021 | 4.0 | 0.60 | 0.013 | 0.0009 | 0.60 | 0.0010 | 0.0011 | 0.0014 | 0.0004 | 0.0008 | 0.005 | 0.006 | 0.030 | 0.004 | 4.9 |
| 11 | K | 0.0024 | 4.1 | 0.57 | 0.014 | 0.0048 | 0.30 | 0.0014 | 0.0010 | 0.0015 | 0.0005 | 0.0008 | 0.006 | 0.006 | 0.029 | 0.001 | 4.7 |

TABLE 1-continued

| Test No. | Steel type | C | Si | Mn | P | S | sol. Al | N | Ti | Nb | Zr | V | Cu | Ni | Sn | Sb | Value of middle in expression (i) |
|---|---|---|---|---|---|---|---|---|---|---|---|---|---|---|---|---|---|
| 12 | L | 0.0027 | 4.2 | 0.40 | 0.012 | 0.0008 | 0.22 | 0.0015 | 0.0010 | 0.0004 | 0.0001 | 0.0006 | 0.012 | 0.080 | — | 0.030 | 4.6 |
| 13 | M | 0.0026 | 4.6 | 0.23 | 0.013 | 0.0007 | 0.22 | 0.0012 | 0.0011 | 0.0006 | 0.0005 | 0.0004 | 0.013 | 0.085 | 0.012 | 0.013 | 4.9 |
| 14 | N | 0.0023 | 4.1 | 0.58 | 0.018 | 0.0009 | 0.21 | 0.0014 | 0.0011 | 0.0006 | 0.0005 | 0.0003 | 0.013 | 0.092 | 0.022 | 0.001 | 4.6 |
| 15 | O | 0.0029 | 4.6 | 0.24 | <u>0.048</u> | 0.0008 | 0.22 | 0.0013 | 0.0012 | 0.0005 | 0.0005 | 0.0003 | 0.012 | 0.086 | 0.022 | 0.001 | 4.9 |
| 16 | P | 0.0035 | 3.9 | 0.10 | <u>0.006</u> | 0.0004 | 0.38 | 0.0020 | 0.0007 | 0.0015 | 0.0010 | 0.0012 | 0.150 | 0.352 | 0.055 | 0.002 | 4.3 |
| 17 | Q | 0.0010 | 3.9 | 0.53 | 0.025 | 0.0015 | 0.45 | 0.0026 | 0.0038 | 0.0010 | 0.0036 | 0.0008 | 0.101 | 0.153 | 0.015 | 0.003 | 4.6 |
| 18 | R | 0.0033 | 3.8 | 0.35 | 0.008 | 0.0010 | 0.32 | 0.0011 | 0.0010 | 0.0038 | 0.0010 | 0.0041 | 0.013 | 0.215 | 0.001 | 0.057 | 4.3 |
| 19 | S | <u>0.0052</u> | 3.9 | 0.32 | 0.014 | 0.0011 | 0.31 | 0.0019 | 0.0035 | 0.0015 | 0.0010 | 0.0012 | 0.008 | 0.036 | 0.010 | 0.002 | 4.4 |
| 20 | T | <u>0.0018</u> | 5.0 | 0.07 | 0.014 | 0.0011 | 0.10 | 0.0019 | 0.0035 | 0.0015 | 0.0010 | 0.0012 | 0.008 | 0.036 | 0.010 | 0.002 | <u>5.1</u> |
| 21 | U | 0.0028 | 3.9 | 0.95 | 0.015 | 0.0012 | <u>0.01</u> | 0.0018 | 0.0015 | 0.0010 | 0.0012 | 0.0008 | 0.060 | 0.031 | 0.018 | 0.001 | <u>4.4</u> |
| 22 | V | 0.0020 | 4.1 | 0.28 | 0.013 | 0.0008 | <u>0.33</u> | 0.0014 | 0.0010 | 0.0008 | 0.0009 | 0.0017 | 0.026 | 0.022 | <u>0.110</u> | — | 4.6 |
| 23 | W | 0.0020 | 4.1 | 0.28 | 0.013 | 0.0008 | 0.33 | 0.0014 | 0.0010 | 0.0008 | 0.0009 | 0.0017 | 0.026 | 0.022 | <u>0.001</u> | <u>0.115</u> | 4.6 |

$4.3 \leq Si + sol. Al + 0.5 \times Mn \leq 5.0 \ldots$ (i)

The underlines indicate that the numerals are outside the range of the present invention.

TABLE 2

| Test No. | Steel type | Tensile strength (MPa) | Whole circumferential average $W_{10/400}$ (W/Kg) | Whole circumferential average $B_{50}$ (T) | $\Delta B_{50}$ (T) | Remarks |
|---|---|---|---|---|---|---|
| 1 | A | <u>578</u> | 10.5 | 1.59 | 0.14 | Comparative example |
| 2 | B | <u>595</u> | 10.4 | 1.59 | 0.14 | Inventive example |
| 3 | C | 608 | 10.3 | 1.59 | 0.13 | |
| 4 | D | 644 | 10.1 | 1.58 | 0.12 | |
| 5 | E | Fracturing occurred during secondary cold rolling. | | | | Comparative example |
| 6 | F | 619 | 11.5 | 1.59 | 0.11 | Inventive example |
| 7 | G | 675 | 10.2 | 1.57 | 0.13 | |
| 8 | H | <u>573</u> | 11.2 | 1.60 | 0.13 | Comparative example |
| 9 | I | <u>606</u> | 10.2 | 1.59 | 0.15 | Inventive example |
| 10 | J | 610 | 10.2 | 1.58 | <u>0.17</u> | Comparative example |
| 11 | K | <u>617</u> | 12.2 | 1.58 | <u>0.14</u> | |
| 12 | L | 619 | 10.4 | 1.59 | 0.13 | Inventive example |
| 13 | M | 668 | 10.1 | 1.57 | 0.13 | |
| 14 | N | 610 | 10.3 | 1.59 | 0.13 | |
| 15 | O | Fracturing occurred during secondary cold rolling. | | | | Comparative example |
| 16 | P | 596 | 10.9 | 1.60 | 0.14 | Inventive example |
| 17 | Q | 600 | 10.4 | 1.59 | 0.15 | |
| 18 | R | 583 | 10.8 | 1.60 | 0.14 | |
| 19 | S | 598 | 12.3 | 1.60 | 0.14 | Comparative example |
| 20 | T | Fracturing occurred during secondary cold rolling. | | | | |
| 21 | U | 600 | 12.5 | 1.60 | 0.14 | |
| 22 | V | Fracturing occurred during secondary cold rolling. | | | | |
| 23 | W | | | | | |

The underlines indicate that the numerals are outside the range of the present invention.

From each test material obtained, Epstein test pieces were taken in the rolling direction, in the direction of 45° from the rolling direction, and in the direction of 90° from the rolling direction, and the magnetic characteristics in each direction (the iron loss $W_{10/400}$ and the magnetic flux density $B_{50}$) were evaluated by the Epstein test according to JIS C 2550-1 (2011). In a case in which the whole circumferential average iron loss $W_{10/400}$ was 12.0 W/kg or less, the whole circumferential average magnetic flux density $B_{50}$ was 1.57 T or more, and the $\Delta B_{50}$ was 0.16 T or less, the magnetic characteristics were determined to be exceptional and passed. In a case in which these conditions were not satisfied, the magnetic characteristics were determined to be inferior and failed. Also, the reason for setting such a condition for pass is that the final sheet thickness of a cold-rolled material for each test material was 0.20 mm or less.

Further, from each test material, JIS No. 5 tensile test pieces were taken according JIS Z 2241 (2011) such that their longitudinal directions coincide with the rolling direction of the steel sheet. Then, using the above test pieces, a tensile test was performed according to JIS Z 2241 (2011) to measure their tensile strength. Samples with tensile strength of 580 MPa or more were determined to have high strength and passed. Samples with tensile strength of less than 580 MPa were determined to have inferior strength and failed.

Table 2 also shows results of the Epstein test and the tensile test. Also, the underlines in Tables 1 and 2 indicate compositions outside the scope of the present invention. In addition, the symbol "–" in the chemical composition table shown in Table 1 indicates that an amount of the corresponding element is 0% in significant figures (values up to the least significant digit) specified in the present embodiment.

It was found that Test Nos. 2 to 4, 6, 7, 9, 12 to 14, and 16 to 18, of which chemical compositions of steel sheets satisfy the limitations of the present invention, have low whole circumferential average iron loss, high whole circumferential average magnetic flux density, small anisotropy of the magnetic flux density, and high tensile strength of 580 MPa or more.

In contrast thereto, Test Nos. 1, 5, 8, 10, 11, 15, and 19 to 23, which are comparative examples, either the magnetic characteristics or the tensile strength was inferior, or the toughness significantly deteriorated, which made manufacturing difficult.

Specifically, in Test No. 1, the Si content was lower than the specified range, resulting in inferior tensile strength. Also, in Test No. 8, since the expression (i) was not satisfied, the tensile strength was inferior.

In Test No. 5, the expression (i) was not satisfied, and in Test No. 15, the P content exceeded the specified range, and thus their toughness deteriorated and fracturing occurred during cold rolling, making it impossible to measure the tensile strength and the magnetic characteristics. Similarly, in Test No. 20, the Si content did not satisfy the expression (i), in Test No. 22, the Sn content exceeded the specified range, and in Test No. 23, the Sb content exceeded the specified range, and thus their toughness deteriorated and fracturing occurred during cold rolling, making it impossible to measure the tensile strength and the magnetic characteristics.

In Test No. 10, the sol. Al content exceeded the specified range, resulting in inferior anisotropy of the magnetic flux density. In Test No. 11, the S content exceeded the specified range, resulting in an inferior iron loss. In Test No. 19, the C content exceeded the specified range, resulting in an inferior iron loss. In Test No. 21, the sol. Al content was lower than the specified range, resulting in inferior iron loss.

sheets. The intermediate-annealed sheets were subjected to the secondary cold rolling to have a thickness of 0.20 mm to obtain cold-rolled steel sheets. Further, in mixed atmospheres of $H_2$: 15%, $N_2$: 85%, and dew points shown in Table 3, the finish annealing was performed at soaking temperatures shown in Table 3 for 20 seconds. After that, an insulating coating was applied to manufacture non-oriented electrical steel sheets, which were used as test materials. Also, as shown in Test No. 40, a comparative example was also carried out in which hot-rolled sheet annealing was performed under soaking conditions of 950° C.×60 seconds.

TABLE 3

| Test No. | Sheet thickness after primary cold rolling (mm) | Intermediate annealing temperature (° C.) | Rolling reduction after secondary cold rolling (%) | Finish annealing conditions Soaking temperature (° C.) | Dew point (° C.) | Tensile strength (MPa) | Whole circumferential average $W_{10/400}$ (W/Kg) | Whole circumferential average $B_{50}$ (T) | $\Delta B_{50}$ (T) | Crystal grain size (μm) | Remarks |
|---|---|---|---|---|---|---|---|---|---|---|---|
| 24 | <u>1.1</u> | 950 | Fracturing occurred during secondary cold rolling. | | | | | | | | Comparative example |
| 25 | 1.0 | 950 | 80 | 1000 | −30 | 610 | 10.3 | 1.60 | 0.11 | 79 | Inventive example |
| 26 | 0.8 | 950 | 75 | 1000 | −30 | 608 | 10.2 | 1.59 | 0.13 | 83 | example |
| 27 | 0.6 | 950 | 67 | 1000 | −30 | 603 | 10.2 | 1.59 | 0.16 | 82 | |
| 28 | 0.5 | 950 | <u>60</u> | 1000 | −30 | 600 | 10.3 | 1.58 | <u>0.18</u> | 81 | Comparative example |
| 29 | 0.8 | <u>780</u> | <u>75</u> | 1000 | −30 | 609 | 10.4 | <u>1.56</u> | <u>0.15</u> | 75 | example |
| 30 | 0.8 | <u>900</u> | 75 | 1000 | −30 | 608 | 10.3 | <u>1.58</u> | 0.13 | 80 | Inventive |
| 31 | 0.8 | 1000 | 75 | 1000 | −30 | 610 | 10.1 | 1.60 | 0.11 | 87 | example |
| 32 | 0.8 | 1050 | 75 | 1000 | −30 | 608 | 10.1 | 1.60 | 0.09 | 90 | |
| 33 | 0.8 | <u>1070</u> | Fracturing occurred during secondary cold rolling. | | | | | | | | Comparative example |
| 34 | 0.8 | <u>950</u> | 75 | 830 | −30 | 629 | 13.5 | 1.58 | 0.13 | 31 | example |
| 35 | 0.8 | 950 | 75 | <u>1070</u> | −30 | <u>572</u> | <u>10.7</u> | 1.58 | 0.13 | 132 | |
| 36 | 0.8 | 900 | 75 | 950 | −50 | 618 | 11.0 | 1.58 | 0.13 | 62 | Inventive |
| 37 | 0.8 | 900 | 75 | 950 | −10 | 617 | 11.1 | 1.58 | 0.12 | 63 | example |
| 38 | 0.8 | 900 | 75 | 950 | 20 | 615 | 11.1 | 1.57 | 0.13 | 63 | |
| 39 | 0.22 | 900 | <u>9.1</u> | <u>800</u> | −10 | 620 | 12.3 | 1.58 | 0.16 | 45 | Comparative example |
| 40 | Fracturing occurred during secondary cold rolling. | | | | | | | | | | |
| 41 | <u>1.5</u> | 950 | Fracturing occurred during secondary cold rolling. | | | | | | | | |

The underlines indicate that the numerals are outside the range of the present invention.

Example 2

A slab of steel type I in Table 1 was heated to 1150° C., then hot-rolled at a finishing temperature of 850° C. and a finishing sheet thickness of 2.0 mm and coiled at 650° C. to obtain a hot-rolled steel sheet. The obtained hot-rolled steel sheet was subjected to pickling to remove surface scales without hot-rolled sheet annealing, and then reduced to sheet thicknesses shown in Table 3 to obtain primary cold-rolled sheets. The primary cold-rolled sheets of each thickness were subjected to degreasing treatment, then subjected to intermediate annealing at soaking temperatures shown in Table 3 for 30 seconds to obtain intermediate-annealed In addition, the above insulating coating was formed by applying an insulating coating made of aluminum phosphate and an acrylic-styrene copolymer resin emulsion with a particle size of 0.2 μm such that the adhesion amount was 900 mg/m² and performing baking at 350° C. in the atmosphere.

From each test material obtained, Epstein test pieces were taken in the rolling direction, in the direction of 45° from the rolling direction, and in the direction of 90° from the rolling direction, and the magnetic characteristics in each direction (the iron loss $W_{10/400}$ and the magnetic flux density $B_{50}$) were evaluated by the Epstein test according to JIS C 2550-1 (2011). In a case of samples in which the whole circumferential average iron loss $W_{10/400}$ was 12.0 W/kg or less, the whole circumferential average magnetic flux density $B_{50}$ was 1.57 T or more, and the $\Delta B_{50}$ was 0.16 T or less, the magnetic characteristics were determined to be exceptional and passed. In a case of samples in which these conditions were not satisfied, the magnetic characteristics were determined to be inferior and failed. Also, the reason for setting these conditions for pass is that the sheet thickness of each test material was 0.20 mm or less.

Further, from each test material, JIS No. 5 tensile test pieces were taken according to JIS Z 2241 (2011) such that their longitudinal directions coincided with the rolling directions of the steel sheets. Then, using the above test pieces, a tensile test was performed according to JIS Z 2241 (2011) to measure the tensile strength. Samples with tensile strength of 580 MPa or more were determined to have high strength and passed. Samples with tensile strength of less than 580 MPa were determined to have inferior strength and failed.

Table 3 also shows results of the Epstein test and the tensile test.

It was found that Test Nos. 25 to 27, 30 to 32, and 36 to 38, of which sheet thicknesses after the primary cold rolling, intermediate annealing temperatures, and rolling reductions in the secondary cold rolling satisfy the limitations of the present invention, have low whole circumferential average iron loss, high whole circumferential magnetic flux density, small anisotropy of the magnetic flux density, and high tensile strength of 580 MPa or more.

In contrast thereto, in Test Nos. 24, 28, 29, 33 to 35, and 39 to 41, which are comparative examples, the magnetic characteristics were inferior, the tensile strength was inferior, or the toughness was significantly deteriorated, making manufacturing difficult.

Specifically, in Test Nos. 24 and 41, the sheet thicknesses after the primary cold rolling were thicker than the specified range, and thus the toughness deteriorated and fracturing occurred during the secondary cold rolling, making it impossible to measure the tensile strength and the magnetic characteristics. In Test No. 33, since the intermediate annealing temperature was higher than the specified range, the toughness deteriorated and fracturing occurred during the secondary cold rolling, making it impossible to measure the tensile strength and the magnetic characteristics. Also, in Test No. 40, since the hot-rolled sheet annealing was performed, the toughness deteriorated and fracturing occurred during the primary cold rolling, making it impossible to measure the tensile strength and the magnetic characteristics.

Further, in Test No. 28, the rolling reduction in the secondary cold rolling was lower than the specified range, resulting in inferior anisotropy of the magnetic flux density. In addition, in Test No. 29, the intermediate annealing temperature was lower than the specified range, resulting in inferior whole circumferential average magnetic flux density.

In addition, in Test No. 34, the finish annealing temperature was lower than the specified value, resulting in inferior whole circumferential average iron loss. On the other hand, in Test No. 35, the finish annealing temperature was higher than the specified temperature, resulting in inferior tensile strength.

In Test No. 39, the rolling reduction in the secondary cold rolling was lower than the specified range, and the finish annealing temperature was also lower than the specified range, resulting in inferior iron loss.

INDUSTRIAL APPLICABILITY

As described above, according to the present invention, the non-oriented electrical steel sheet having high strength and exceptional magnetic characteristics can be obtained.

The invention claimed is:

1. A non-oriented electrical steel sheet comprising a base material having a chemical composition containing, by mass %,
C: 0 to 0.0050%,
Si: 3.8 to 4.9%,
Mn: 0.05 to 1.20%,
sol. Al: more than 0.02% and 0.50% or less,
P: 0 to 0.030%,
S: 0 to 0.0030%,
N: 0 to 0.0030%,
Ti: 0% or more and less than 0.0050%,
Nb: 0% or more and less than 0.0050%,
Zr: 0% or more and less than 0.0050%,
V: 0% or more and less than 0.0050%,
Cu: 0% or more and less than 0.200%,
Ni: 0% or more and less than 0.500%,
Sn: 0 to 0.100%,
Sb: 0 to 0.100%, and
the balance: Fe and impurities,
wherein the non-oriented electrical steel sheet satisfies the following expressions (i) to (iii), and
has tensile strength of 580 MPa or greater, $$4.3 \leq Si + sol. Al + 0.5 \times Mn \leq 5.0 \quad \text{(i)}$$

where element symbols in the above expression (i) are amounts (by mass %) of each element, $$B_{50}(0°) - B_{50}(45°) \leq 0.16 \quad \text{(ii)}$$

$$B_{50}(0°) + 2 \times B_{50}(45°) + B_{50}(90°))/4 \geq 1.57 \quad \text{(iii)}$$

where $B_{50}(0°)$ in the above expressions (ii) and (iii) is magnetic flux density (T) at a magnetizing force of 5000 A/m in a rolling direction, $B_{50}(45°)$ is magnetic flux density (T) at a magnetizing force of 5000 A/m in a direction of 45° from the rolling direction, and $B_{50}(90°)$ is magnetic flux density (T) at a magnetizing force of 5000 A/m in a direction of 90° from the rolling direction.

2. A method for manufacturing the non-oriented electrical steel sheet according to claim 1, comprising performing in order:
for a steel ingot having a chemical composition containing, by mass %,
C: 0 to 0.0050%,
Si: 3.8 to 4.9%,
Mn: 0.05 to 1.20%,
sol. Al: more than 0.02% and 0.50% or less,
P: 0 to 0.030%,
S: 0 to 0.0030%,
N: 0 to 0.0030%,
Ti: 0% or more and less than 0.0050%,
Nb: 0% or more and less than 0.0050%,
Zr: 0% or more and less than 0.0050%,
V: 0% or more and less than 0.0050%,
Cu: 0% or more and less than 0.200%,
Ni: 0% or more and less than 0.500%,
Sn: 0 to 0.100%,
Sb: 0 to 0.100%, and
the balance: Fe and impurities,
the chemical composition satisfying the following expression (i):

$$4.3 \leq Si + sol. Al + 0.5 \times Mn \leq 5.0 \quad \text{(i)}$$

where element symbols in the above expression (i) are amounts (by mass %) of each element,
a hot rolling step;
a primary cold rolling step of reducing a sheet thickness to 1.0 mm or less;
an intermediate annealing step with a soaking temperature of 800 to 1050° C. and a soaking time of 1 to 300 sec;
a secondary cold rolling step with a rolling reduction of 65% or more and less than 85%; and a finish annealing step with an annealing temperature of 850 to 1050° C., $$4.3 \leq Si + sol. Al + 0.5 \times Mn \leq 5.0 \quad (i)$$

where element symbols in the above expression (i) are amounts (by mass %) of each element.

3. The non-oriented electrical steel sheet according to claim 1, further comprising an insulating coating on a surface of the base material.

4. A method for manufacturing the non-oriented electrical steel sheet according to claim 3, comprising performing in order:

for a steel ingot having a chemical composition containing, by mass %,
C: 0 to 0.0050%,
Si: 3.8 to 4.9%,
Mn: 0.05 to 1.20%,
sol. Al: more than 0.02% and 0.50% or less,
P: 0 to 0.030%,
S: 0 to 0.0030%,
N: 0 to 0.0030%,
Ti: 0% or more and less than 0.0050%,
Nb: 0% or more and less than 0.0050%,
Zr: 0% or more and less than 0.0050%,
V: 0% or more and less than 0.0050%,
Cu: 0% or more and less than 0.200%,
Ni: 0% or more and less than 0.500%,
Sn: 0 to 0.100%,
Sb: 0 to 0.100%, and
the balance: Fe and impurities,
the chemical composition satisfying the following expression (i):

$$4.3 \leq Si+sol. Al+0.5 \times Mn \leq 5.0 \quad (i)$$

where element symbols in the above expression (i) are amounts (by mass %) of each element,
a hot rolling step;
a primary cold rolling step of reducing a sheet thickness to 1.0 mm or less;
an intermediate annealing step with a soaking temperature of 800 to 1050° C. and a soaking time of 1 to 300 sec;
a secondary cold rolling step with a rolling reduction of 65% or more and less than 85%; and
a finish annealing step with an annealing temperature of 850 to 1050° C., $$4.3 \leq Si + sol. Al + 0.5 \times Mn \leq 5.0 \quad (i)$$

where element symbols in the above expression (i) are amounts (by mass %) of each element.

5. The non-oriented electrical steel sheet according to claim 1,
wherein the chemical composition contains one or two elements selected from, by mass %,
Sn: 0.005 to 0.100%, and
Sb: 0.005 to 0.100%.

6. A method for manufacturing the non-oriented electrical steel sheet according to claim 5, comprising performing in order:
for a steel ingot having a chemical composition containing, by mass %,
C: 0 to 0.0050%,
Si: 3.8 to 4.9%,
Mn: 0.05 to 1.20%,
sol. Al: more than 0.02% and 0.50% or less,
P: 0 to 0.030%,
S: 0 to 0.0030%,
N: 0 to 0.0030%,
Ti: 0% or more and less than 0.0050%,
Nb: 0% or more and less than 0.0050%,
Zr: 0% or more and less than 0.0050%,
V: 0% or more and less than 0.0050%,
Cu: 0% or more and less than 0.200%,
Ni: 0% or more and less than 0.500%,
Sn: 0.005 to 0.100%,
Sb: 0 to 0.100%, and
the balance: Fe and impurities,
the chemical composition satisfying the following expression (i):

$$4.3 \leq Si+sol. Al+0.5 \times Mn \leq 5.0 \quad (i)$$

where element symbols in the above expression (i) are amounts (by mass %) of each element,
a hot rolling step;
a primary cold rolling step of reducing a sheet thickness to 1.0 mm or less;
an intermediate annealing step with a soaking temperature of 800 to 1050° C. and a soaking time of 1 to 300 sec;
a secondary cold rolling step with a rolling reduction of 65% or more and less than 85%; and
a finish annealing step with an annealing temperature of 850 to 1050° C., $$4.3 \leq Si + sol. Al + 0.5 \times Mn \leq 5.0 \quad (i)$$

where element symbols in the above expression (i) are amounts (by mass %) of each element.

7. A method for manufacturing the non-oriented electrical steel sheet according to claim 5, comprising performing in order:
for a steel ingot having a chemical composition containing, by mass %,
C: 0 to 0.0050%,
Si: 3.8 to 4.9%,
Mn: 0.05 to 1.20%,
sol. Al: more than 0.02% and 0.50% or less,
P: 0 to 0.030%,
S: 0 to 0.0030%,
N: 0 to 0.0030%,
Ti: 0% or more and less than 0.0050%,
Nb: 0% or more and less than 0.0050%,
Zr: 0% or more and less than 0.0050%,
V: 0% or more and less than 0.0050%,
Cu: 0% or more and less than 0.200%,
Ni: 0% or more and less than 0.500%,
Sn: 0 to 0.100%,
Sb: 0.005 to 0.100%, and
the balance: Fe and impurities,
the chemical composition satisfying the following expression (i), $$4.3 \leq Si+sol. Al+0.5 \times Mn \leq 5.0 \quad (i)$$

where element symbols in the above expression (i) are amounts (by mass %) of each element,
a hot rolling step;
a primary cold rolling step of reducing a sheet thickness to 1.0 mm or less;

an intermediate annealing step with a soaking temperature of 800 to 1050° C. and a soaking time of 1 to 300 sec;
a secondary cold rolling step with a rolling reduction of 65% or more and less than 85%; and
a finish annealing step with an annealing temperature of 850 to 1050° C.

8. The non-oriented electrical steel sheet according to claim 5, further comprising an insulating coating on a surface of the base material.

9. A method for manufacturing the non-oriented electrical steel sheet according to claim 8, comprising performing in order:
for a steel ingot having a chemical composition containing, by mass %,
C: 0 to 0.0050%,
Si: 3.8 to 4.9%,
Mn: 0.05 to 1.20%,
sol. Al: more than 0.02% and 0.50% or less,
P: 0 to 0.030%,
S: 0 to 0.0030%,
N: 0 to 0.0030%,
Ti: 0% or more and less than 0.0050%,
Nb: 0% or more and less than 0.0050%,
Zr: 0% or more and less than 0.0050%,
V: 0% or more and less than 0.0050%,
Cu: 0% or more and less than 0.200%,
Ni: 0% or more and less than 0.500%,
Sn: 0.005 to 0.100%,
Sb: 0 to 0.100%, and
the balance: Fe and impurities,
the chemical composition satisfying the following expression (i):

$$4.3 \leq Si + sol.\ Al + 0.5 \times Mn \leq 5.0 \qquad (i)$$

where element symbols in the above expression (i) are amounts (by mass %) of each element,
a hot rolling step;
a primary cold rolling step of reducing a sheet thickness to 1.0 mm or less;
an intermediate annealing step with a soaking temperature of 800 to 1050° C. and a soaking time of 1 to 300 sec;
a secondary cold rolling step with a rolling reduction of 65% or more and less than 85%; and
a finish annealing step with an annealing temperature of 850 to 1050° C., $$4.3 \leq Si + sol.\ Al + 0.5 \times Mn \leq 5.0 \qquad (i)$$

where element symbols in the above expression (i) are amounts (by mass %) of each element.

10. A method for manufacturing the non-oriented electrical steel sheet according to claim 8, comprising performing in order:
for a steel ingot having a chemical composition containing, by mass %,
C: 0 to 0.0050%,
Si: 3.8 to 4.9%,
Mn: 0.05 to 1.20%,
sol. Al: more than 0.02% and 0.50% or less,
P: 0 to 0.030%,
S: 0 to 0.0030%,
N: 0 to 0.0030%,
Ti: 0% or more and less than 0.0050%,
Nb: 0% or more and less than 0.0050%,
Zr: 0% or more and less than 0.0050%,
V: 0% or more and less than 0.0050%,
Cu: 0% or more and less than 0.200%,
Ni: 0% or more and less than 0.500%,
Sn: 0 to 0.100%,
Sb: 0.005 to 0.100%, and
the balance: Fe and impurities,
the chemical composition satisfying the following expression (i), $$4.3 \leq Si + sol.\ Al + 0.5 \times Mn \leq 5.0 \qquad (i)$$

where element symbols in the above expression (i) are amounts (by mass %) of each element,
a hot rolling step;
a primary cold rolling step of reducing a sheet thickness to 1.0 mm or less;
an intermediate annealing step with a soaking temperature of 800 to 1050° C. and a soaking time of 1 to 300 sec;
a secondary cold rolling step with a rolling reduction of 65% or more and less than 85%; and
a finish annealing step with an annealing temperature of 850 to 1050° C.

* * * * *